US011435639B2

(12) United States Patent
Kim et al.

(10) Patent No.: US 11,435,639 B2
(45) Date of Patent: Sep. 6, 2022

(54) PRIVACY FILM AND DISPLAY DEVICE INCLUDING THE SAME (71) Applicant: LG Display Co., Ltd., Seoul (KR)

(72) Inventors: Sooyoun Kim, Gyeonggi-do (KR); SeongYong Uhm, Gyeonggi-do (KR); Seong-Il Kim, Gyeonggi-do (KR); SeokHo Lee, Gyeonggi-do (KR)

(73) Assignee: LG DISPLAY CO., LTD., Seoul (KR)

(*) Notice: Subject to any disclaimer, the term of this patent is extended or adjusted under 35 U.S.C. 154(b) by 0 days.

(21) Appl. No.: 17/112,176

(22) Filed: Dec. 4, 2020

(65) Prior Publication Data

US 2021/0191166 A1 Jun. 24, 2021

(30) Foreign Application Priority Data

Dec. 18, 2019 (KR) .................. 10-2019-0169594

(51) Int. Cl.
G02F 1/137 (2006.01)
G02F 1/1334 (2006.01)
G02F 1/1343 (2006.01)
G02F 1/1335 (2006.01)

(52) U.S. Cl.
CPC ............ G02F 1/137 (2013.01); G02F 1/1334 (2013.01); G02F 1/13439 (2013.01); G02F 1/133512 (2013.01); G02F 1/134309 (2013.01)

(58) Field of Classification Search
CPC ...... G02F 1/137; G02F 1/1335; G02F 1/1334; G02F 1/13439; G02F 1/134309; G02F 1/133512; G02F 1/13476; G02F 1/1323; G02B 5/20; G02B 1/10
See application file for complete search history.

(56) References Cited

U.S. PATENT DOCUMENTS

2006/0262057 A1* 11/2006 Sumiyoshi ........... G09G 3/3614
345/87
2011/0310085 A1* 12/2011 Mimura ............... G09G 3/2003
345/214

FOREIGN PATENT DOCUMENTS

| JP | 2012-529661 A | 11/2012 |
|---|---|---|
| JP | 2013-541727 A | 11/2013 |
| JP | 2016-512348 A | 4/2016 |
| JP | 6443691 B2 | 12/2018 |
| KR | 10-2008-0097752 A | 11/2008 |
| KR | 10-2010-0091977 A | 8/2010 |
| KR | 10-2010-0116079 A | 10/2010 |
| KR | 10-2014-0085466 A | 7/2014 |
| KR | 10-2017-0038299 A | 4/2017 |
| KR | 10-2017-0091718 A | 8/2017 |

(Continued)

Primary Examiner — Anne M Hines
Assistant Examiner — Jose M Diaz
(74) Attorney, Agent, or Firm — Birch, Stewart, Kolasch & Birch, LLP (57) ABSTRACT The present disclosure relates to a privacy film and a display device including the privacy film, and more specifically, to a privacy film capable of reducing a viewing angle by including a first substrate, a first electrode disposed on the first substrate, a plurality of light blocking patterns disposed on the first electrode, a light transmission layer disposed on the first electrode and the plurality of light blocking patterns and including a plurality of capsules, a second electrode disposed on the light transmission layer, and a second substrate disposed on the second electrode, and a display device including the privacy film.

17 Claims, 6 Drawing Sheets (56) References Cited

FOREIGN PATENT DOCUMENTS

| KR | 10-2019-0069975 A | 6/2019 |
| KR | 10-2019-0078831 A | 7/2019 |

* cited by examiner

PRIVACY FILM AND DISPLAY DEVICE INCLUDING THE SAME

CROSS-REFERENCE TO RELATED APPLICATION

This application claims the priority benefit of Korean Patent Application No. 10-2019-0169594, filed on Dec. 18, 2019 in the Korean Intellectual Property Office, the entire contents of which are hereby expressly incorporated by reference into the present application.

BACKGROUND

1. Technical Field

The present disclosure relates to a privacy film and a display device including the privacy film.

2. Description of the Related Art

Display devices are widely used as display screens of various products, such as televisions, notebook computers, monitors, and ATMs in banks, as well as mobile communication terminals, electronic notebooks, e-books, portable multimedia players (PMPs), navigation, ultra mobile PCs (UMPCs), cellular telephones, smart phones, tablet computers, watch phones, wearable smart devices, and the like.

The display devices serve to display information desired by a user as video images, and are usually designed to have a wide viewing angle for enabling the user to view the images from various angles. However, according to products having the display device, some products having the display device are configured with the wide viewing angle. In some of these cases, there can be a possibility that the characteristics of such products may be adversely affected. In some instances, a user can desire to view images at a narrow viewing angle.

For example, in the case of ATMs (automated teller machines) used in association with banks or other financial institutions, when a user inputs personal information, it is required to prevent other people from viewing such personal information. It is therefore preferable that a viewing angle of the associated display device is narrower in some cases.

For another example, in the case of navigation of a vehicle, in case a viewing angle of an upper portion or a lower portion of an associated display device is wide, images displayed on the display device can degrade a driver's concentration and interfere with driving. Moreover, when driving at night, the images displayed on the display device can be reflected from the windshield of the vehicle, and lead to adversely affecting the safety of the driver.

Thus, display devices are usually manufactured to have a wide viewing angle, but it can be desirable to have a narrow viewing angle depending on products having the display devices.

SUMMARY OF THE INVENTION

It is at least one object of the present disclosure to provide a privacy film having a reduced thickness, improved luminous efficiency and a narrow viewing angle by disposing a plurality of light blocking patterns and a plurality of capsules in one film, and a display device including the privacy film.

In accordance with one aspect of the present disclosure, provided are a privacy film including a first substrate, a first electrode disposed on the first substrate, a plurality of light blocking patterns disposed on the first electrode, a light transmission layer disposed on the first electrode and the plurality of light blocking patterns and including the plurality of capsules, a second electrode disposed on the light transmission layer, and a second substrate disposed on the second electrode; and a display device including the privacy film.

In accordance with another aspect of the present disclosure, a display device is provided that includes a display panel, a backlight unit disposed under of the display panel and a privacy film disposed between the display panel and the backlight unit, wherein the privacy film includes a first substrate, a first electrode disposed on the first substrate, a plurality of light blocking patterns disposed on the first electrode, a light transmission layer disposed on the first electrode and the plurality of light blocking patterns and including the plurality of capsules, a second electrode disposed on the light transmission layer, and a second substrate disposed on the second electrode.

In accordance with embodiments of the present disclosure, it is possible to provide a privacy film having a reduced thickness, improved luminous efficiency and a narrow viewing angle by disposing a plurality of light blocking patterns and a plurality of capsules in one film, and to provide a display device including the privacy film.

DETAILED DESCRIPTION OF THE EMBODIMENTS

In the following description of examples or embodiments of the present invention, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present invention, detailed descriptions of well-known functions and components incorporated herein will be omitted when it is determined that the description can make the subject matter in some embodiments of the present invention rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(a)", or "(b)" can be used herein to describe elements of the present invention. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element can be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms can be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified. Further, the term "may" fully encompasses all the meanings of the term "can".

Hereinafter, exemplary embodiments of the present disclosure will be described in detail with reference to the accompanying drawings.

Figure 1:
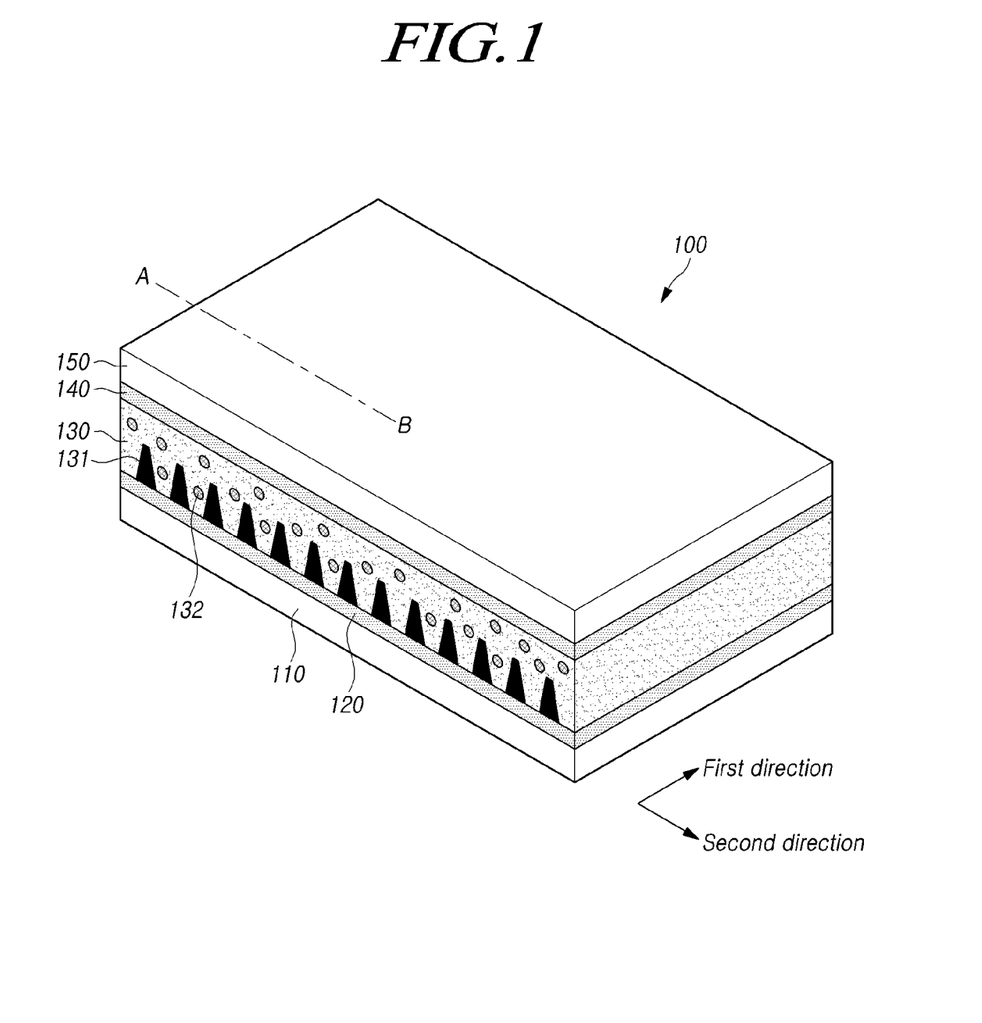
FIG. 1 is a perspective view illustrating a privacy film according to one or more embodiments of the present disclosure.
Figure 2:
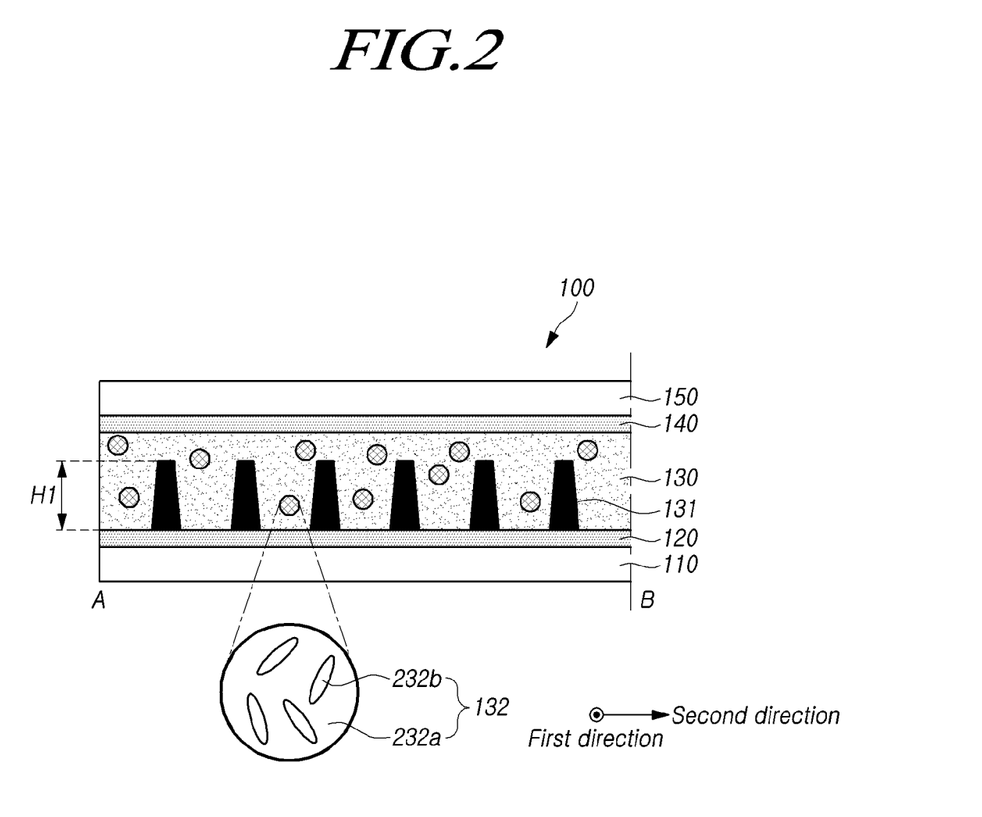
FIG. 2 is a cross-sectional view taken along line A-B of FIG. 1.
Figure 3:
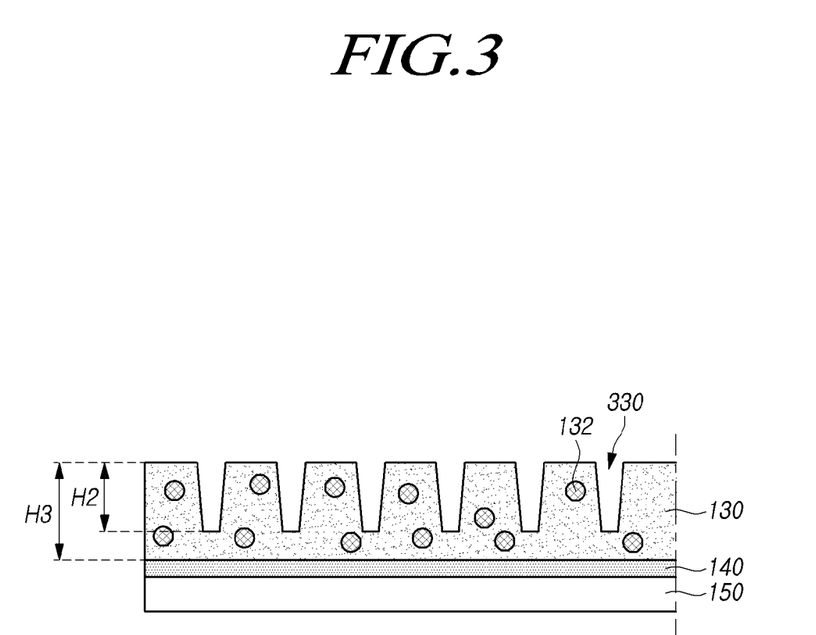
FIG. 3 illustrates a structure of a light transmission layer according to one or more embodiments of the present disclosure.

FIG. 1 is a perspective view illustrating a privacy film according to one or more embodiments of the present disclosure. FIG. 2 is a cross-sectional view taken along line A-B of FIG. 1. FIG. 3 illustrates a structure of a light transmission layer according to one or more embodiments of the present disclosure.

Referring to FIGS. 1 to 3, a privacy film 100 according to the one or more embodiments of the present disclosure can be a film that becomes transparent or opaque depending on whether a voltage is applied. For example, the privacy film 100 can be in a transparent state (a privacy mode, or a narrow viewing angle mode) when a voltage is applied to the privacy film 100, and the privacy film 100 can be in an opaque state (a normal mode) when a voltage is not applied to the privacy film 100. Here, the opaque state can include a state in which the privacy film 100 becomes blurred.

Referring to FIGS. 1 and 2, the privacy film 100 according to the embodiments of the present disclosure can include a first substrate 110, a first electrode 120, a light transmission layer 130, one or more light blocking patterns 131, a second electrode 140 and a second substrate 150.

The first substrate 110 can include a material with high light transmittance.

For example, the first substrate 110 can include at least one of polyimide (PI), cyclic olefin polymer (COP), polycarbonate (PC), polyethylene terephthalate (PET), polyethylene naphthalate (PEN), Polynorbornene (PNB) and polyethersulfone (PES); however, the embodiments of the present disclosure are not limited thereto.

The first electrode 120 can be disposed on the first substrate 110.

The first electrode 120 can include a conductive material with high light transmittance.

For example, the first electrode 120 can include a transparent conductive material. Here, the transparent conductive material can include at least one of indium tin oxide (ITO), indium zinc oxide (IZO), indium tin zinc oxide (ITZO), fluorine tin oxide (FTC), aluminum zinc oxide (AZO) or antimony tin oxide (ATO); however, the embodiments of the present disclosure are not limited thereto.

A plurality of light blocking patterns 131 can be disposed on the first electrode 120.

The plurality of light blocking patterns 131 can be an element for controlling a viewing angle by limiting a traveling path of light incident from the outside.

For example, the plurality of light blocking patterns 131 can serve to reduce a viewing angle by blocking light incident in a direction inclined at a certain angle to the first electrode 120. In other words, the viewing angle can be adjusted by passing light in a direction perpendicular to a direction (corresponding to a second direction in FIG. 2) parallel to a width of the plurality of light blocking patterns 131, and blocking light incident in a direction inclined to the width of the plurality of light blocking patterns 131 (e.g., an another direction intersecting the direction parallel to the width of the plurality of light blocking patterns 125).

The plurality of light blocking patterns 131 can include an organic material capable of blocking light incident in the inclined direction. For example, the plurality of light blocking patterns 131 can include a colored organic material such as black carbon etc.; however, the embodiments of the present disclosure are not limited thereto.

In one example, the plurality of light blocking patterns 131 can be disposed to be spaced apart from one another in order easily to block at least part of light incident to the light blocking patterns 131.

A width of an one surface of the plurality of light blocking patterns 131 which contacts the first electrode 120 can be greater than a width of the other surface facing the one surface contacting the first electrode 120, and thus, the plurality of light blocking patterns 131 can have a trapezoidal cross section; however, the embodiments of the present disclosure are not limited thereto. For example, a cross-sectional shape of the plurality of light blocking patterns 131 can be circular or polygonal.

The plurality of light blocking patterns 131 can be formed by a printing process or a patterning process.

For example, the printing process can be implemented using roll printing, screen printing, gravure printing, gravure-offset printing, or flexo printing, which is known in the art; however, the embodiments of the present disclosure are not limited thereto. The patterning process can be implemented by a process of forming a mask pattern material on the first electrode 120 and a process of selectively etching the mask pattern material, and the etching process can be a wet etching process, a dry etching process, or a laser scribing process. However, the embodiments of the present disclosure are not limited thereto.

Meanwhile, FIG. 1 illustrates that the plurality of light blocking patterns 131 has a stripe structure extending in a first direction (e.g., a direction having a short width when a cross section of the first substrate 110 is rectangular); however, the embodiments of the present disclosure are not limited thereto.

For example, the plurality of light blocking patterns 131 can have a stripe structure extending in a second direction (e.g., a direction having a long width when a cross section of the first substrate 110 is rectangular) intersecting the first direction.

Shapes of the plurality of light blocking patterns 131 according to embodiments of the present disclosure are not limited thereto, and each of the plurality of light blocking patterns 131 can have a shape depending on desirable viewing angle control characteristics.

The light transmission layer 130 including a plurality of capsules 132 can be disposed on the plurality of light blocking patterns 131 and the first electrode 120.

The light transmission layer 130 can include an organic material having a high light transmittance and being capable of easily distributing the plurality of capsules 132. Further, at least one type of the organic material included in the light transmission layer 130 can be an organic material capable of being cured by ultraviolet light.

For example, the light transmission layer 130 can include one or more resins selected from a group including an acrylate resin, a urethane resin, an epoxy resin, a polyester resin, and a phenol resin. Materials included in the light transmission layer 130 according to embodiments of the present disclosure are not limited thereto.

Further, the light transmission layer 130 can further include a diluent, a cross linking agent, an initiator, and the like.

The diluent included in the light transmission layer 130 can include at least one of 2-ethylhexyl acrylate (EHA), isooctyl acrylate (IOA) and isodecyl acrylate (IDA); however, the embodiments of the present disclosure are not limited thereto.

The cross linking agent included in the light transmission layer 130 can include a bifunctional or trifunctional monomer. For example, the cross linking agent can include at least one of trimethylolpropane triacrylate (TMPTA), tri (propylene glycol) diacrylate (TPGDA), poly (ethylene glycol) diacrylate (PEGDA) and 1,6-hexanediol diacrylate; however, the embodiments of the present disclosure are not limited thereto.

The initiator included in the light transmission layer 130 can include at least one of 2-hydroxy-2-methyl-1-phenyl propane-1-one (HMPPO), 2,2-dimethoxy 2-phenylacetophenone (DMAP) and IRGACURE 184; however, the embodiments of the present disclosure are not limited thereto.

The light transmission layer 130 can include at least one groove 330 as illustrated in FIG. 3.

At least one of the plurality of light blocking patterns 131 can be located in the at least one groove 330 included in the light transmission layer 130.

At this time, a height H1 of the at least one light blocking pattern 131 can correspond to a height H2 of the groove 330 of the light transmission layer 130. For example, a height H3 of the light transmission layer 130 can be greater than that of the at least one light blocking pattern 131. In an example, the heights H1 and H2 can be the same.

Here, the height H3 of the light transmission layer 130 can be 20 μm to 40 μm. Since the light transmission layer 130 has the height H3 of 20 μm to 40 μm, an appropriate amount of capsules 132 can be dispersed in the light transmission layer 130. Meanwhile, such a height H3 of the light transmission layer 130 is merely one example; therefore, the embodiments of the present disclosure are not limited thereto.

Accordingly, a top surface and a side surface of the at least one light blocking pattern 131 can contact the light transmission layer 130.

Like this, as the plurality of light blocking patterns 131 is accommodated inside of the groove 330 of the light transmission layer 130 in which the plurality of capsules 132 is dispersed, it is possible to reduce of the thickness of an associated privacy film 100. Specifically, when at least one light blocking pattern 131 is not located inside of the groove 330 of the light transmission layer 130, a corresponding privacy film 100 can increase a thickness corresponding to a height H1 of the light blocking pattern 131, but, according to the embodiment of the present disclosure, since the at least one light blocking pattern 131 is located inside of the groove 330 of the light transmission layer 130, even when the at least one light blocking pattern 131 is included in the privacy film 100, it is possible to provide an effect of preventing a thickness of the privacy film 100 from being increased.

Meanwhile, in FIGS. 1 and 2, since a height H1 of at least one of the light blocking patterns 131 and a height H2 of the groove 330 of the light transmission layer 130 correspond to each other, a structure in which the top surface and at least one side surface of the at least one light blocking pattern 131 contact the light transmission layer 130 is illustrated; however, the embodiments of the present disclosure are not limited thereto.

For example, at least a part of the at least one light blocking pattern 131 can overlap at least a part of the groove 330 of the light transmission layer 130. At this time, a part of a top surface and at least one side surface of the at least one light blocking pattern 131 can contact the light transmission layer 130; for example, in some examples, the light blocking pattern 131 can entirely or partially overlap the groove 330 in a height direction; embodiments of the present disclosure are not limited thereto.

In this case, a thickness of the privacy film 100 can be reduced by an area in which the side surface of the at least one light blocking pattern 131 overlaps the light transmission layer 130.

The plurality of capsules 132 can be included in the light transmission layer 130.

The plurality of capsules 132 can serve to scatter or transmit light depending on whether a voltage is applied to the privacy film 100.

For example, when a voltage is applied to the privacy film 100, light having transmitted the first substrate 110 and the first electrode 120 can pass through the light transmission layer 130 and then exit through the second substrate 150. When a voltage is not applied to the privacy film 100, light having transmitted the first substrate 110 and the first electrode 120 can be scattered by the plurality of capsules 132 dispersed on the light transmission layer 130, and then, while some of the light cannot exit from the second substrate 150, the other exits from the second substrate 150. Here, since the light having exited from the second substrate 150 exits at various angles, thus, the privacy film can have a wide viewing angle.

The plurality of capsules 132 can include a matrix (or a substrate) 232a and a plurality of particles 232b included in the matrix 232a.

Here, at least one particle 232b can be a molecule with an anisotropic permittivity and an anisotropic refractive index. For example, the at least one particle 232b can be polymer dispersed liquid crystal PDLC; however, types of particles according to embodiments of the present disclosure are not limited thereto.

Since the at least one particle 232b has the anisotropic permittivity and the anisotropic refractive index, when a voltage is applied to the privacy film 100 and when a voltage is not applied to the privacy film 100, for example, when an electric field is formed through at least one particle 232b by an applied voltage and when an electric field is not formed through at least one particle 262 due to not applying a voltage, the particles can have different permittivities and refractive indexes.

When a voltage is not applied to the privacy film 100, as shown in FIG. 2, the plurality of particles 232b can be irregularly present in the matrix 232a.

Further, when a voltage is not applied to the privacy film 100, a refractive index of at least one particle 232b and a refractive index of the matrix 232a can be different.

In other words, a difference in refractive indexes of the matrix 232a of the capsule 132 and the at least one particle 232b can occur, leading light incident to the capsule 132 to be scattered in an interface of the matrix 232a and the at least one particle 232b.

Here, since light incident to the privacy film 100 is scattered by the plurality of particles 232b and exits through the second substrate 150 at various angles, the privacy film 100 can be in an opaque state (a normal mode).

Meanwhile, when a voltage is applied to the privacy film 100, the plurality of particles 232b can be arranged in a constant direction in the matrix 232a.

Further, when a voltage is applied to the privacy film 100, a refractive index of the at least one particle 232b and a refractive index of the matrix 232a can correspond to each other. Accordingly, light incident to the capsule 132 is not scattered in an interface of the matrix 232a and the at least particle 232b and can exit through the second substrate 150 (a privacy mode).

In the resin included in the light transmission layer 130, a content of the plurality of particles 232b can be 30 to 70%.

In case the content of the plurality of particles 232b is less than 30% in the resin included in the light transmission layer 130, when a voltage is not applied (in an off-state) to the privacy film 100, an amount of light incident to the privacy film 100 scattered by the plurality of particles 232b can be reduced; therefore, the privacy film may not become opaque in the off-state. In this case, side viewing angle characteristics of the privacy film 100 can be reduced.

Further, in case the content of the plurality of particles 232b is more than 70% in the resin included in the light transmission layer 130, when a voltage is applied (in an on-state) to the privacy film 100, an amount of light incident to the privacy film 100 scattered by the plurality of particles 232b can be too much increased; therefore, the privacy film may not become transparent in the on-state.

The second electrode 140 can be disposed on the light transmission layer 130.

The second electrode 140 can include a conductive material with high light transmittance.

For example, the second electrode 140 can include a transparent conductive material. Here, the transparent conductive material can include at least one of indium tin oxide (ITO), indium zinc oxide (IZO), indium tin zinc oxide (ITZO), fluorine thin oxide (FTC), aluminum zinc oxide (AZO) or antimony tin oxide (ATO); however, the embodiments of the present disclosure are not limited thereto.

The first electrode 120 and the second electrode 140 according to embodiments of the present disclosure can include one or material(s) being corresponded to each other or different materials.

The second electrode 140 can be disposed to be spaced apart from at least one of the plurality of light blocking patterns 131.

As described above, a top surface of the at least one light blocking pattern 131 can be disposed to contact the light transmission layer 130 and therefore, can be disposed to be spaced apart from the second electrode 140.

The second substrate 150 can be disposed on the second electrode 140.

The second substrate 150 can include a material with high light transmittance.

For example, the second substrate 150 can include at least one of polyimide (PI), cyclic olefin polymer (COP), polycarbonate (PC), polyethylene terephthalate (PET), polyethylene naphthalate (PEN), Polynorbornene (PNB) and polyethersulfone (PES); however, the embodiments of the present disclosure are not limited thereto.

The first substrate 110 and the second substrate 150 according to the embodiments of the present disclosure can include one or material(s) being corresponded to each other or different materials.

Hereinafter, discussions will be given on the normal mode and the privacy mode of the privacy film according to one or more embodiments of the present disclosure in detail with reference to FIGS. 4 and 5.

Figure 4:
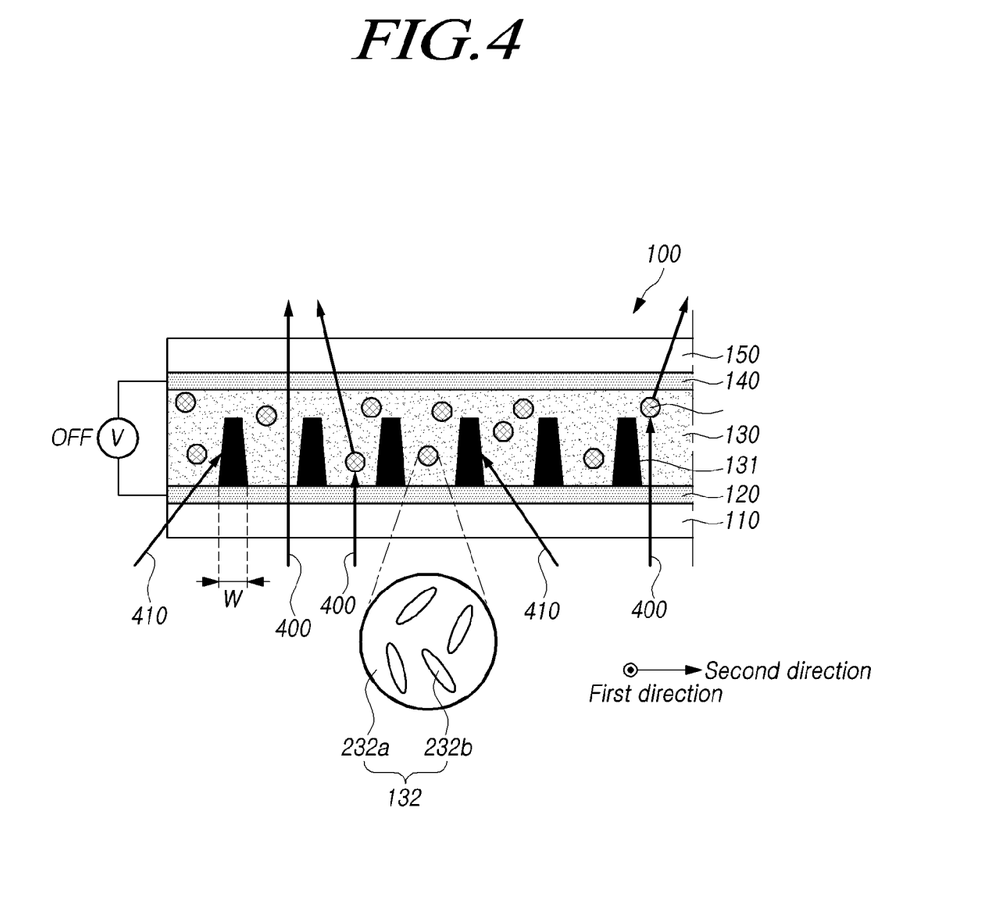
FIG. 4 illustrates a normal mode of the privacy film according to one or more embodiments of the present disclosure.

FIG. 4 illustrates a normal mode of the privacy film according to one or more embodiments of the present disclosure. FIG. 5 illustrates a privacy mode of the privacy film according to one or more embodiments of the present disclosure.

In the following description, some configurations, effects etc. of the embodiments or examples discussed above may not be repeatedly described for convenience of description.

Referring to FIG. 4, when the privacy film 100 according to the one or more embodiments of the present disclosure is in an off-state, i.e. to which a voltage is not applied, a plurality of particles 232b in the plurality of capsules 133 included in the light transmission layer 130 can be in an irregular arrangement state.

Further, when a voltage is not applied to the privacy film 100, a refractive index of the plurality of particle 232b and a refractive index of the matrix 232a of the capsule 132 can be different. For example, a difference in the refractive index of the plurality of particles 232b and the refractive index of the matrix 232a can be 0.1 to 0.3; however, the embodiments of the present disclosure are not limited thereto.

Due to the difference in the refractive indexes of the plurality of particles 232b and the matrix 232a, light 400 incident to the light transmission layer 130 passing through the first substrate 110 and the first electrode 120 can be scattered in an interface between at least one particle 232b and the matrix 232a.

Further, some of the light 400 incident to the light transmission layer 130 after having passed through the first substrate 110 and the first electrode 120 can transmit the second electrode 140 and the second substrate 150 and then exit outwardly.

At this time, an amount of light scattered by the plurality of capsules 132 can be larger than an amount of light transmitting the light transmission layer 130 (e.g., light transmitted from/through the light transmission layer 130).

In this case, the privacy film 100 can be in an opaque state (or a blurred state).

Meanwhile, the light 400 incident to the light transmission layer 130 after having passed through the first substrate 110 and the first electrode 120 can be light that is not absorbed by the light blocking patterns 131.

Further, light 410 incident to the light blocking patterns 131 can be absorbed by the light blocking patterns 131. In particular, the plurality of light blocking patterns 131 can absorb light incident in a direction intersecting a direction in which the first substrate 110 and the first electrode 120 are stacked.

Thus, the light blocking patterns 131 can absorb light 410 that deteriorates viewing angle characteristics.

Figure 5:
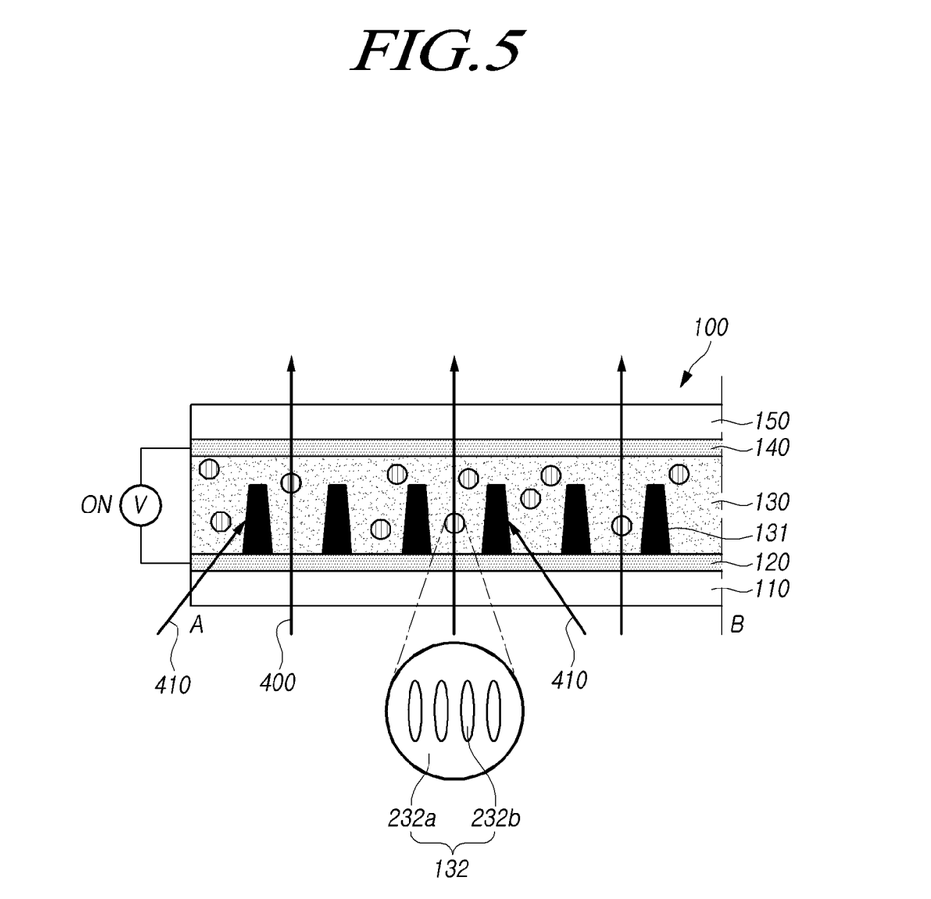
FIG. 5 illustrates a privacy mode of the privacy film according to one or more embodiments of the present disclosure.

Referring to FIG. 5, when the privacy film 100 according to embodiments of the present disclosure is in an on-state, i.e. to which a voltage is applied, a plurality of particles 232*b* in the plurality of capsules 133 included in the light transmission layer 130 can be arranged in a constant direction.

Voltage of 20V to 60V can be applied to the privacy film 100. However, this range of voltages is merely an exemplary range; thus, the embodiments of the present disclosure are not limited thereto.

Further, when a voltage is applied to the privacy film 100, a refractive index of the plurality of particles 232*b* and a refractive index of the matrix 232*a* of the capsule 132 can correspond to each other.

Since the refractive index of the plurality of particles 232*b* and the refractive index of the matrix 232*a* correspond to each other, light 400 incident to the light transmission layer 130 after having passed through the first substrate 110 and the first electrode 120 can transmit the plurality of capsules 132 and the light transmission layer 130, transmit the second electrode 140 and the second substrate 150, and then, exit outwards from the privacy film 100.

It should be understood that the embodiments of the present disclosure are not limited thereto, and when a voltage is applied to the privacy file 100, in case a difference in refractive indexes of the plurality of particles 232*b* and the matrix 232*a* is smaller than a difference in refractive indexes of the plurality of particles 232*b* and the matrix 232*a* when a voltage is not applied to the privacy film 100, implementations related to this instance can be included within the scope of the present disclosure.

At this time, an amount of light scattered by the plurality of capsules 132 can be significantly smaller than an amount of light transmitting the light transmission layer 130 (e.g., light transmitted from/through the light transmission layer 13).

In this case, the privacy film 100 can be in a transparent state (the privacy mode).

The light exiting through the privacy film 100 can be light in a direction corresponding to a direction in which the first substrate 110 and the first electrode 120 are stacked.

Thus, when the privacy film 100 according to the embodiments of the present disclosure is in the privacy mode, there is an effect of enabling a direction of the light exiting from the privacy film 100 to be adjusted.

The privacy film 100 according to the embodiments of the present disclosure can be used alone, such as a smart window, or the like.

Further, the privacy film according to the embodiments of the present disclosure can be applied to a display device. An example of such a structure is discussed with reference to FIG. 6.

Figure 6:
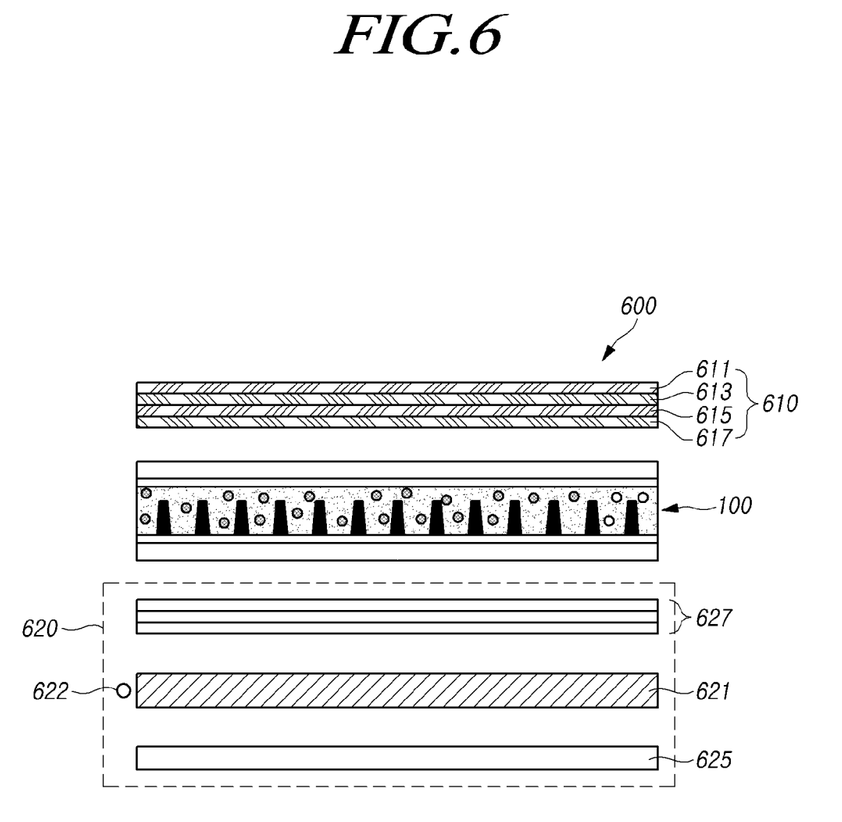
FIG. 6 illustrates a display device including the privacy film according to one or more embodiments of the present disclosure.

FIG. 6 illustrates a display device including the privacy film according to one or more embodiments of the present disclosure. All the components of the display device according to all embodiments of the present disclosure are operatively coupled and configured.

In the following description, some configurations, effects etc. of the embodiments or examples discussed above may not be repeatedly described for convenience of description.

Referring to FIG. 6, a display device 600 according to one or more embodiments of the present disclosure can include a display panel 610, a privacy film 100, and a backlight unit 620.

Specifically, the display device 600 includes the display panel 610, the privacy film 100 disposed under the display panel 610, and the backlight unit 620 disposed under the privacy film 100.

The display panel 610 can display images using light incident by passing through the privacy film 100 after having generated from the backlight unit 620.

The display panel 610 can include first and second substrates 613 and 615 that are bonded by a sealant together with a liquid crystal layer interposed therebetween.

The first substrate 613 can include a plurality of pixels including a thin film transistor electrically connected to a gate line and a data line, a pixel electrode electrically connected to the thin film transistor, and a common electrode forming an electric field on the liquid crystal layer together with the pixel electrode.

The second substrate 615 can include a color filter overlapping with each pixel. Additionally, the color filter can be located on the first substrate 613 to overlap with pixel electrode of each pixel, and in this instance, the second substrate 615 can be used as a cover substrate.

A first polarizing plate 611 can be disposed on the top surface of the first substrate 613, and a second polarizing plate 617 can be disposed on the bottom surface of the second substrate 615. Here, a polarization axis of the first polarizing plate 611 and a polarization axis of the second polarizing plate 617 can be set in a direction intersecting each other.

Additionally, locations of the first and second substrates 613 and 615 can be reversed. For example, the second substrate 615 with the color filter can be disposed on the bottom surface of the first substrate 613 with a plurality of pixels. Thus, by driving a liquid crystal layer according to electric field formed in each pixel by a common voltage and a data voltage applied to each pixel, the display panel 610 can display certain color images according to the light transmittance of the liquid crystal layer.

The privacy film 100 disposed under the display panel 610 can be the privacy film with the structures as in FIGS. 1 and 2.

The backlight unit 620 serves to emit light to the display panel 610, and can include a light guide plate 621, a light source 623, a reflective sheet 625, and an optical sheet 627.

The light guide plate 621 can be disposed under the display panel 610, and cause light entering through a light entering portion located on one side thereof to travel toward the rear surface of the display panel 610.

The light source 623 can serve to emit light to the light entering portion of the light guide plate 621. In one example, the light source 623 can include a package of light emitting diodes that is mounted on a printed circuit board for the light source, driven by a light-source-delivering signal provided from backlight driver, and emits light, such as white light.

Meanwhile, FIG. 6 illustrates that the light source 623 is located on one side of the light guide plate 621; however, the embodiments of the present disclosure are not limited thereto. For example, the light source 623 can be located on the rear surface of the light guide plate 621. In this instance, the light guide plate 621 can be referred to as a diffusing plate.

The reflective sheet 625 is located under the light guide plate 621, and minimizes the loss of light by reflecting light entering after passing through the rear surface of the light guide plate 621 to the inside of the light guide plate 621.

The optical sheet 627 is located on the light guide plate 621, and can include a lower diffusion sheet, a prism sheet, and an upper diffusion sheet, but embodiments of the present disclosure are not limited thereto. For example, the optical sheet 627 can be formed from various combinations by stacking two or more of a diffusion sheet, a prism sheet, a dual brightness enhancement film, and a lenticular sheet.

The privacy film 100 can be disposed between the display panel 610 and the backlight unit 620, and control a viewing angle of the display panel 610 by blocking light entering at a predetermined angle or more from the backlight unit 620.

Specifically, when the display device 600 is driven, a voltage can also be applied to the privacy film 100, light provided from the backlight unit 620 can transmit the light transmission layer 130 after passing through the first substrate 110 and the first electrode 120 of the privacy film 100, transmit the second electrode 140 and the second substrate 150, and then exit toward the display panel 610.

At this time, light exiting outwards through the display panel 610 can be light in a direction vertical to a width direction of at least one light blocking pattern 131 of the privacy film 100.

Thus, the display device 600 using the privacy film 100 according to one or more embodiments of the present disclosure can cause a viewing angle of the display device 600 to be reduced, Thus, the display device 600 using the privacy film 100 can enable only a user to view images in the display device 600 by not allowing other people around the user of the display device 600 to view the images in the display device 800.

Since in the privacy film 100 according to the embodiments of the present disclosure, an air layer (e.g., an air layer located between films different from each other) is not present in the film, the privacy film 100 can have significant high luminous efficiency compared with a privacy film in which an air layer is present according to a comparative example.

Further, in the privacy film 100 according to the embodiments of the present disclosure, a plurality of light blocking patterns 131 and a plurality of capsules 132 are present in one film, and the privacy film 100 does not include an air layer. Therefore, it is possible to provide an effect of significantly reducing a thickness of the privacy film 100.

The above description has been presented to enable any person skilled in the art to make and use the technical idea of the present invention, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the present invention. The above description and the accompanying drawings provide an example of the technical idea of the present invention for illustrative purposes only. For example, the disclosed embodiments are intended to illustrate the scope of the technical idea of the present invention.

Thus, the scope of the present invention is not limited to the embodiments shown, but is to be accorded the widest scope consistent with the claims. The scope of protection of the present invention should be construed based on the following claims, and all technical ideas within the scope of equivalents thereof should be construed as being included within the scope of the present invention.

What is claimed is:

1. A privacy film comprising:
    a first substrate;
    a first electrode disposed on the first substrate;
    a plurality of light blocking patterns disposed on the first electrode;
    a light transmission layer disposed on the first electrode and the plurality of light blocking patterns, and including a plurality of capsules;
    a second electrode disposed on the light transmission layer; and
    a second substrate disposed on the second electrode,
    wherein the light transmission layer includes at least one groove, and at least one of the plurality of light blocking patterns is disposed in the at least one groove of the light transmission layer.

2. The privacy film according to claim 1, wherein the plurality of light blocking patterns is disposed to be spaced apart from the second electrode.

3. The privacy film according to claim 1, wherein the light transmission layer contacts an upper surface and a side surface of at least one of the plurality of light blocking patterns.

4. The privacy film according to claim 1, wherein a content of the plurality of capsules in a resin included in the light transmission layer is approximately 30% to 70%.

5. The privacy film according to claim 1, wherein the light transmission layer includes one or more resins selected from a group including an acrylate resin, a urethane resin, an epoxy resin, a polyester resin, and a phenol resin.

6. The privacy film according to claim 1, wherein the plurality of capsules includes a matrix and a plurality of particles included in the matrix,
    wherein at least one of the plurality of particles is a molecule with an anisotropic permittivity and an anisotropic refractive index, and
    wherein a refractive index of the at least one particle is different from a refractive index of the matrix when a voltage is not applied to the privacy film, and corresponds to the refractive index of the matrix when a voltage is applied to the privacy film.

7. The privacy film according to claim 6, wherein an amount of light scattered by the plurality of capsules is greater than an amount of light transmitted from the light transmission layer when a voltage is not applied to the privacy film, and is smaller than an amount of light transmitted through the light transmission layer when a voltage is applied to the privacy film.

8. The privacy film according to claim 1, wherein the first and second electrodes include a transparency conductive material.

9. A display device comprising:
    a display panel;
    a backlight unit located under the display panel; and
    a privacy film located between the display panel and the backlight unit,
    wherein the privacy film comprises:
        a first substrate;
        a first electrode disposed on the first substrate;
        a plurality of light blocking patterns disposed on the first electrode;
        a light transmission layer disposed on the first electrode and the plurality of light blocking patterns, and including a plurality of capsules;

a second electrode disposed on the light transmission layer; and a second substrate disposed on the second electrode, and wherein the light transmission layer contacts an upper surface and a side surface of at least one of the plurality of light blocking patterns.

10. The display device according to claim 9, wherein the plurality of light blocking patterns is disposed to be spaced apart from the second electrode.

11. The display device according to claim 9, wherein the light transmission layer includes a plurality of grooves, and at least one of the plurality of light blocking patterns is disposed in at least one groove of the plurality of grooves of the light transmission layer.

12. The display device according to claim 9, wherein a content of the plurality of capsules in a resin included in the light transmission layer is approximately 30% to 70%.

13. The display device according to claim 9, wherein the light transmission layer includes one or more resins selected from a group including an acrylate resin, a urethane resin, an epoxy resin, a polyester resin, and a phenol resin.

14. The display device according to claim 9, wherein the plurality of capsules includes a matrix and a plurality of particles included in the matrix, wherein at least one of the plurality of particles is a molecule with an anisotropic permittivity and an anisotropic refractive index, and wherein a refractive index of the at least one particle is different from a refractive index of the matrix when a voltage is not applied to the privacy film, and corresponds to the refractive index of the matrix when a voltage is applied to the privacy film.

15. The display device according to claim 14, wherein an amount of light scattered by the plurality of capsules is greater than an amount of light transmitted from the light transmission layer when a voltage is not applied to the privacy film, and is smaller than an amount of light transmitted through the light transmission layer when a voltage is applied to the privacy film.

16. The display device according to claim 9, wherein the first and second electrodes include a transparency conductive material.

17. A privacy film comprising:

a first substrate;

a first electrode disposed on the first substrate;

a plurality of light blocking patterns disposed on the first electrode;

a light transmission layer disposed on the first electrode and the plurality of light blocking patterns, and including a plurality of capsules;

a second electrode disposed on the light transmission layer; and a second substrate disposed on the second electrode, wherein the light transmission layer contacts an upper surface and a side surface of at least one of the plurality of light blocking patterns.

* * * * *